(12) United States Patent
Allouche et al.

(10) Patent No.: US 9,062,423 B2
(45) Date of Patent: Jun. 23, 2015

(54) CAST-IN-PLACE FIBER TECHNOLOGY

(71) Applicants: CenturyLink Intellecutal Property LLC, Denver, CO (US); Louisiana Tech University Research Foundation, a division of Louisiana Tech University Foundation, Inc., Ruston, LA (US)

(72) Inventors: Erez N. Allouche, Ruston, LA (US); Bryan Cady, Ruston, LA (US); Michael L. Elford, Calhoun, LA (US)

(73) Assignees: CenturyLink Intellectual Property LLC, Denver, CO (US); Louisiana Tech University Research Foundation, Inc., Ruston, LA (US)

( * ) Notice: Subject to any disclaimer, the term of this patent is extended or adjusted under 35 U.S.C. 154(b) by 0 days.

(21) Appl. No.: 14/209,754

(22) Filed: Mar. 13, 2014

(65) Prior Publication Data

US 2014/0270971 A1 Sep. 18, 2014

Related U.S. Application Data (60) Provisional application No. 61/793,514, filed on Mar. 15, 2013.

(51) Int. Cl.
*E02F 5/10* (2006.01)
*G02B 6/50* (2006.01)
(Continued)

(52) U.S. Cl.
CPC . *E01F 9/041* (2013.01); *E02F 5/10* (2013.01); *G02B 6/504* (2013.01); *E01F 9/081* (2013.01); *E01F 11/00* (2013.01)

(58) Field of Classification Search
CPC ............. E02F 5/10; E02F 5/101; G02B 6/504
USPC .................. 405/155, 157, 179, 190, 184.4
See application file for complete search history.

(56) References Cited

U.S. PATENT DOCUMENTS 2,754,101 A 7/1956 Haworth et al.
4,034,567 A 7/1977 Roggen
(Continued)

FOREIGN PATENT DOCUMENTS

JP 10-140507 A 5/1998
WO WO 2013-130644 A1 9/2013
WO WO 2014-151726 A1 9/2014

OTHER PUBLICATIONS

International Search Report and Written Opinion prepared by the Korean Intellectual Property Office as International Searching Authority for PCT International Patent Application No. PCT/US2014/26325, mailed Aug. 8, 2014, 12 pages.
(Continued)

*Primary Examiner* — Frederick L Lagman
(74) *Attorney, Agent, or Firm* — Swanson & Bratschun, L.L.C.

(57) ABSTRACT

Novel tools and techniques for installing lines or cables, including, without limitation, power lines, low voltage lines, telecommunications lines or cables (e.g., telephone cables, network cables, television cables, etc.), and/or the like, and, in particular, installing optical fiber and/or other lines, slightly below ground level in a roadway or other ground surface. In some cases, a method might include creating a channel in the ground surface, placing one or more lines (e.g., power lines, low voltage lines, telecommunications lines, and/or the like) in the channel, and placing a capping material in the channel, thereby encapsulating the lines. In some cases, placing the one or more lines in the channel might include placing a conduit (containing the one or more lines) in the channel, and encapsulating the one or more lines might include encapsulating the conduit. The capping material might include polyurea, thermosetting material, and/or any other suitable material.

21 Claims, 5 Drawing Sheets

(51) Int. Cl.
*E01F 9/04* (2006.01)
*E01F 9/08* (2006.01)
*E01F 11/00* (2006.01)

(56) References Cited

U.S. PATENT DOCUMENTS

| | | | |
|---|---|---|---|
| 4,329,083 | A | 5/1982 | Parkinson |
| 4,815,814 | A | 3/1989 | Ulijasz |
| 5,313,546 | A | 5/1994 | Toffetti |
| 5,879,109 | A | 3/1999 | Diermeier et al. |
| 6,099,080 | A | 8/2000 | Hirashita et al. |
| 6,371,691 | B1 | 4/2002 | Finzel et al. |
| 6,503,025 | B1 | 1/2003 | Miller |
| 6,807,355 | B2 | 10/2004 | Dofher |
| 6,866,448 | B2 * | 3/2005 | Finzel et al. ............ 405/157 |
| 7,050,683 | B2 | 5/2006 | Dofher |
| 7,095,930 | B2 | 8/2006 | Storaasli et al. |
| 7,514,628 | B2 | 4/2009 | Kadrnoska et al. |
| 7,740,417 | B2 * | 6/2010 | Jang ............ 405/157 |
| 7,849,886 | B2 | 12/2010 | Carew et al. |
| D640,290 | S | 6/2011 | Stellman et al. |
| 8,061,344 | B2 | 11/2011 | Dofher |
| 8,480,332 | B2 | 7/2013 | Miller |
| 2002/0061231 | A1 * | 5/2002 | Finzel et al. ............ 405/154.1 |
| 2003/0123935 | A1 * | 7/2003 | Dofher ............ 405/183.5 |
| 2004/0234215 | A1 | 11/2004 | Serrano et al. |
| 2005/0191113 | A1 | 9/2005 | Frazier |
| 2005/0191133 | A1 | 9/2005 | Purcell |
| 2005/0259930 | A1 | 11/2005 | Elkins et al. |
| 2006/0204187 | A1 | 9/2006 | Dofher |
| 2007/0154152 | A1 | 7/2007 | Morris |
| 2010/0047021 | A1 * | 2/2010 | Scola ............ 405/179 |
| 2010/0071596 | A1 | 3/2010 | Konczak |
| 2010/0086254 | A1 | 4/2010 | Dofher |
| 2010/0243096 | A1 | 9/2010 | Berglund et al. |
| 2011/0016754 | A1 | 1/2011 | Ruhl et al. |
| 2011/0052131 | A1 | 3/2011 | Park et al. |
| 2012/0048148 | A1 | 3/2012 | Konczak |
| 2012/0195694 | A1 | 8/2012 | Kinczak |
| 2013/0044918 | A1 | 2/2013 | Nielsen et al. |
| 2013/0216313 | A1 * | 8/2013 | Gustavsson et al. ......... 405/157 |
| 2013/0223807 | A1 | 8/2013 | Elford et al. |
| 2013/0287500 | A1 * | 10/2013 | Miller ............ 405/174 |
| 2013/0294839 | A1 * | 11/2013 | Gustavsson et al. ......... 405/174 |
| 2015/0035704 | A1 | 2/2015 | Schwengler et al. |
| 2015/0070221 | A1 | 3/2015 | Schwengler et al. |
| 2015/0110453 | A1 | 4/2015 | Elford et al. |

OTHER PUBLICATIONS

Publication Notice of PCT International Patent Application No. PCT/US2014/26325, mailed Sep. 25, 2014, 1 page.
International Search Report and Written Opinion prepared by the U.S. Patent and Trademark Office as International Searching Authority for PCT International Patent Application No. PCT/US2013/0280 mailed May 3, 2013; 20 pages.
Preliminary Report on Patentability for PCT International Patent Application No. PCT/US2013/0280 mailed Sep. 12, 2014; 13 pages.
U.S. Appl. No. 13/779,488; Non-final Rejection dated Sep. 10, 2014; 11 pages.
U.S. Appl. No. 13/779,488; Requirement for Restriction/Election dated May 30, 2014; 5 pages.
U.S. Appl. No. 13/779,488; Final Rejection dated Feb. 9, 2015; 9 pages.

* cited by examiner

CAST-IN-PLACE FIBER TECHNOLOGY

CROSS-REFERENCES TO RELATED APPLICATIONS

This application claims priority to U.S. Patent Application Ser. No. 61/793,514 (the "'514 application"), filed Mar. 15, 2013 by Erez R. Allouche et al., entitled, "Cast-in-Place Fiber Technology," the entire disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a method and apparatus pertaining to installation of optical fiber, and, more particularly, to a method of installing optical fiber in a ground surface (including without limitation a paved surface) and an apparatus used in installation of optical fiber in a ground surface (including without limitation a paved surface).

BACKGROUND

Current construction methods for the installation of small conduits and cables consist of excavation equipment, vibratory flows (mainly in green field settings), and various trenchless construction methods such as directional drilling and impact moles. While trenchless methods greatly reduce the surface disturbance, they are associated with significant costs. While these costs can be justified for the placement of natural gas lines or water mains, where the vendor has exclusivity and is assured a very high market penetration, the cost is difficult to justify when laying very small diameter fiber optics where initial market penetration may be only 30-35% and the vendor must operate in an aggressive competitive market environment.

Hence, there is a need for a low cost method for installing small diameter fiber optics (and/or other lines) in urbanized areas.

BRIEF SUMMARY

Various embodiments provide tools and techniques for installing telecommunications lines or cables (e.g., telephone cables, network cables, television cables, etc.), and, in particular, optical fiber, slightly below ground level in a roadway or other surface.

Various embodiments might provide method or apparatus for installing lines or cables, including, without limitation, power lines, low voltage lines, telecommunications lines or cables (e.g., telephone cables, network cables, television cables, etc.), and/or the like, and, in particular, installing optical fiber and/or other lines, slightly below ground level in a ground surface (a term which, as used herein, includes in particular paved surfaces, such as asphalt surfaces, concrete surfaces, but also any other type of ground surface). In some cases, a method might include creating a channel in the ground surface, placing one or more lines (e.g., power lines, low voltage lines, telecommunications lines, and/or the like) in the channel, and placing a capping material in the channel, thereby encapsulating the one or more lines. In some cases, placing the one or more lines in the channel might include placing a conduit (containing the one or more lines) in the channel, and encapsulating the one or more lines might include encapsulating the conduit. The capping material might include polyurea. In some instances, the capping material might include thermosetting material and/or any other suitable material.

Merely by way of example, one set of embodiments might provide methods, including, without limitation, methods of installing optical fiber and other lines (e.g., telecommunication lines, power lines, etc.). An exemplary method of installing optical fiber might comprise creating a channel in a roadway surface. The method might further comprise placing a conduit in the channel; in an aspect, the conduit might have disposed therewithin one or more optical fibers. In some embodiments, the method can further comprise slip molding, in place, a capping material comprising polyurea around the conduit to substantially fill the channel. In an aspect, a top surface of the capping material might be substantially coplanar with a top of the roadway surface.

According to some embodiments, a method might comprise creating a channel in a ground surface (which could be a roadway surface in some cases, but might be a variety of other surfaces as well). The method can further include placing one or more lines in the channel. The method, then, might further comprise placing a capping material in the channel. An apparatus, according to another set of embodiments, might comprise one or more lines disposed in a channel in a ground surface. The apparatus might further comprise a capping material disposed around the one or more lines in the ground surface.

In an aspect, a method might comprise creating a channel in a ground surface. The method might also comprise placing at least one conduit in the channel, and the at least one conduit might have disposed therewithin one or more lines. The method might further comprise slip molding, in place, a capping material around the at least one conduit to substantially fill the channel, such that a top surface of the capping material is substantially coplanar with a top of the ground surface.

In some embodiments, creating a channel might comprise milling a channel. The capping material, in some cases, might comprise a thermosetting material. In some instances, the capping material might comprise polyurea. According to some embodiments, the surface might be a roadway surface, and the capping material might serve as road lines on the roadway surface. In some cases, the surface might be a paved surface.

Merely by way of example, the channel might have a width of between about 0.5 inches and about 12 inches, a width of between about 1 inch and about 6 inches, a width of between about 1.5 inches and about 2.5 inches, or a width of between about 0.5 inches and about 1 inch. In some embodiments, the channel might have a depth of no greater than about 3 inches, a depth of no greater than about 1 inch, or a depth of no greater than about 0.5 inches. In some cases, the one or more lines might comprise at least one optical fiber. In some instances, the one or more lines might comprise at least one power line.

Merely by way of example, in some embodiments, the capping material might comprise two or more sealant materials. The two or more sealant materials might, in some cases, comprise a bottom sealant material filling a bottom portion of the channel and a top sealant material filling a top portion of the channel above the bottom sealant material. The bottom sealant material might comprise polyurea and the top sealant material might comprise a material selected from a group consisting of asphalt emulsion, asphalt cement, fiber modified asphalt, polymer modified emulsion, asphalt rubber, specialty asphalt rubber, low modulus specialty asphalt rubber, silicone, polyester, and cement mortar. In a particular set of embodiments, the channel might have a depth of about 3 inches, and the bottom sealant material might fill the bottom portion of the channel to a height of about 2.5 inches (thereby encapsulating the one or more lines and/or the conduit containing the one or more lines) and the top sealant material might fill the top portion of the channel with a height of about 0.5 inches.

In yet another aspect, an apparatus might comprise at least one conduit disposed in a channel in a ground surface. The apparatus might also comprise one or more lines disposed in the at least one conduit. The apparatus might further comprise a capping material disposed around the at least one conduit in the channel in the ground surface, such that a top surface of the capping material is substantially coplanar with a top of the ground surface.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form.

Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide tools and techniques for installing power lines, low voltage lines, telecommunications line or cables (e.g., telephone cables, network cables, television cables, etc.), and/or the like, and, in particular, installing optical fiber and/or other lines, slightly below ground level in a roadway or other surface. Some such embodiments offer several advantages over current construction methods used for the installation of small diameter conduits and cables including some or all of the following: minimal disruption/damage to existing infrastructure; generation of very little waste; high productivity rate; minimal equipment requirements; rapid installation and return to service time of the right of way (approximately one hour in some cases); decreased or eliminated probability of damaging other existing buried services. Such embodiments can have a variety of commercial applications, including, without limitation, installation of fiber optics and/or other telecommunication conduits to homes and business in residential and commercial areas; installation of communication and power conduits in commercial, industrial, and institutional settings; and/or installation of distribution power lines in residential, commercial, industrial, and institutional settings.

We now turn to the embodiments as illustrated by the drawings. FIGS. 1-7 illustrate some of the features of a method of installing cables in a ground surface and an apparatus used in such installation, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

Figure 1:
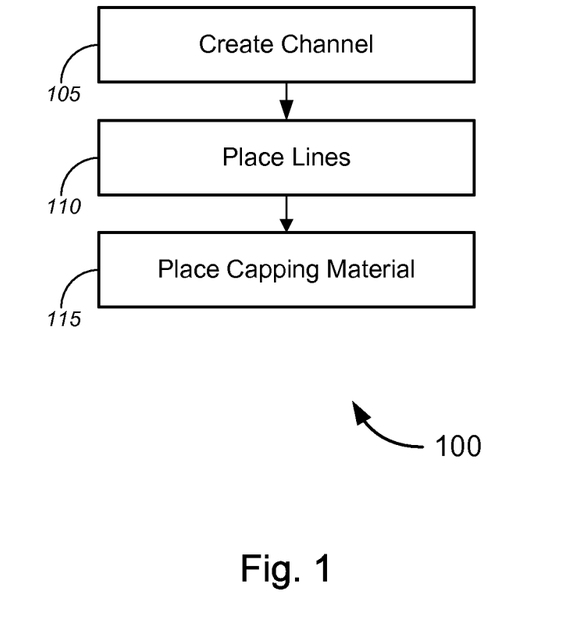
FIG. 1 is a process flow diagram illustrating a method of installing optical fibers or other lines, in accordance with various embodiments.

One set of embodiments provides methods, including, without limitation, methods of installing optical fiber and/or other lines (e.g., telecommunication lines, power lines, low voltage lines, etc.). An exemplary method 100 is illustrated by FIG. 1. The method might comprise, at block 105, creating a channel in a ground surface (which, as noted above, includes in particular paved surfaces, but more specifically could be a roadway surface, or more generally might be a variety of other surfaces as well, including, but not limited to, concrete pathway, and/or the like). In some cases, the channel can be created by milling the roadway or other ground surface. In various aspects, the channel might have a variety of widths. Merely by way of example, in some cases, the channel might have a width of between about 0.5 and about 12 inches, while in other cases, the channel might have a width of between about 1 inch and 6 inches. In other cases, the channel might have a width between about 1.5 inches and about 2.5 inches, or a width of about 2 inches. The depth of the channel can vary as well, so long as the channel does not compromise the structural integrity of the ground surface (e.g., roadway, etc.) in which it is created. Merely by way of example, the channel might have a depth of no greater than about 3 inches, a depth of no greater than about 1 inch, or a depth of no greater than about 0.5 inches. In some embodiments, the depth of the channel might be about 3 inches, while the width of the channel might be either about 0.5 inches or about 1 inch. In other embodiments, the depth of the channel might be 4 or 5 inches, or any depth that is appropriate in light of the circumstances, including the structural features of the roadway (depth, strength, etc.), the characteristics of the communication lines to be installed in the channel, etc.

The method 100 can further include placing one or more lines in the channel (block 110). A variety of different lines can be placed in the channel in accordance with different embodiments, including, without limitation, optical fibers and/or other telecommunication lines, power lines, low voltage lines, conduits for any of these types of lines, and/or the like. Merely by way of example, in one embodiment, a line might comprise a conduit with one or more optical fibers disposed inside.

The method 100, then, might further comprise placing a capping material in the channel (block 115). The capping material, which could comprise a thermosetting material, might be filled to surround the one or more lines in the channel and/or might fill the channel so that the top of the material is substantially coplanar with a top surface of the ground. In other cases, the material might be filled to a depth that leaves a surface of the material slightly lower than the surrounding roadway (which can allow, if desired, for the channel to be filled with other materials, such as the roadway material or loose fill, to a depth that is substantially flush with the roadway).

A number of techniques can be used to place the capping material, including pouring and simultaneously slip molding the material in place in the channel. In some embodiments, the capping material might comprise polyurea (e.g., a polyurea such as the EPL-1.5™ product, commercially available from Specialty Products, Inc. ("SPI"), which can be used with or without adhesion enhancer, SPI Aqua Seal™, SPI Aqua Seal Ultrabond™), polyurea that contains some filler materials (e.g., fly ash, cenospheres, glass bubbles, ceramic spheres, talac, alumina sand), and/or the like. (In one aspect, a polyurea can be an elastomer derived from reaction of an isocyanate component and a synthetic resin through step-growth polymerization.) In some examples, particularly where the ground surface comprises a concrete pathway (and in some cases an asphalt pathway), the capping material might comprise concrete/cement mixture that is poured into the channel (thereby encapsulating the one or more lines and/or one or more conduits containing the one or more lines), and that is allowed to set.

In one aspect of certain embodiments, the capping material can comprise a liquid filler that penetrates the hardened matrix of a paved surface (e.g., concrete, asphalt) into which the channel is cut, and mechanically interlock into the pores of that paving material. This penetration can not only provide enhanced adhesion between the capping material and the surface material, but it can also tend to strengthen the impregnated surface material. In other cases, semi-solid capping materials (such as cementitious and asphalt-based fillers can be used, although these semi-soild filler might not interlock into the pores of the surrounding paving material.

According to some embodiments, the capping material might comprise two or more sealant/filler materials. In some instances, the two or more sealant/filler materials might comprise a bottom sealant material and a top sealant material. The bottom sealant material, which might comprise polyurea or the like, might fill a bottom portion of the channel to a particular height. The top sealant material might fill the remaining portion of the channel (i.e., the top portion of the channel). The top sealant material might include a material selected from a group consisting of asphalt emulsion, asphalt cement, fiber modified asphalt, polymer modified emulsion, asphalt rubber, specialty asphalt rubber, low modulus specialty asphalt rubber, silicone, polyester, and/or cement mortar. Merely by way of example, in some embodiments, the bottom sealant material might fill the bottom portion of a 3 inch deep channel to a height of about 2.5 inches, thereby filling around or otherwise encasing/encapsulating a conduit containing optical fiber and/or other lines, while the top sealant material might fill the top 0.5 inches of the 3 inch deep channel (i.e., filling the remainder of the channel). In cases in which three or more sealant/filler materials are used, each sealant/filler material might form a layer, one on top of a previous layer.

An apparatus provided by other embodiments might comprise one or more lines disposed in a channel in a ground surface (e.g., one or more lines and a channel such as those described above, to name a few examples). The apparatus might further comprise a capping material (e.g., such as the material described above) disposed around the one or more lines in the ground surface. In some cases, the apparatus might be embodied as one or more conduits and/or the like. The one or more conduits might each comprise a hose, tube, pipe, and/or other suitable longitudinal casing. In some cases, the one or more conduits might each comprise therein a longitudinal grid structure, longitudinal scaffold structure, and/or other suitable structure that might hold the various lines in place, and, in some instances, keep the various lines apart from each other (e.g., separating power lines from data lines and/or from low voltage lines, or the like), and/or the like. Alternatively, or additionally, each of the various lines might individually comprise additional insulating layers about an outer circumference thereof in order to ensure isolation and insulation from adjacent lines. In some cases, the additional insulating layers might serve to provide protect against thermal variations (including, but not limited to, day-to-day temperature changes due to weather, temperature changes during the process of installing the lines (e.g., heat extrusion, heat spraying, or heated pouring of capping material (such as thermosetting material), and/or the like), or the like).

In one aspect, certain embodiments can allow a provider or vendor to lay fiber on top of the road surface by creating a shallow groove (e.g., 2" wide, 0.5" deep; 0.5" wide, 3" deep; or 1" wide, 3" deep; and/or the like) in the pavement along the edge of the pavement. In a single operation, a conduit could be placed in the groove while cast-in-place polyurea cap is extruded over it, encapsulating the conduit and bonding it with the road surface. In this embodiment, the conduit provides the thoroughfare for the fiber optic lines while the polyurea provides bonding to the concrete or asphalt surface, mechanical protection against traffic and impact loads (including vandalism), and water tightness. Such embodiments can minimize costs associated with construction and tie-ins, providing a tailored technical solution that is optimized for the physical characteristics of the challenge at hand.

Figure 2:
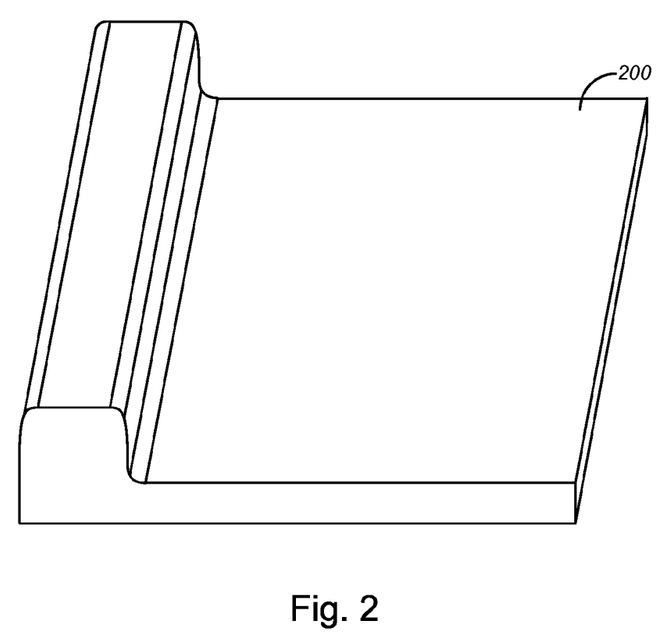
FIGS. 2-5 illustrate various stages of such an installation, in accordance with various embodiments.
Figure 3:
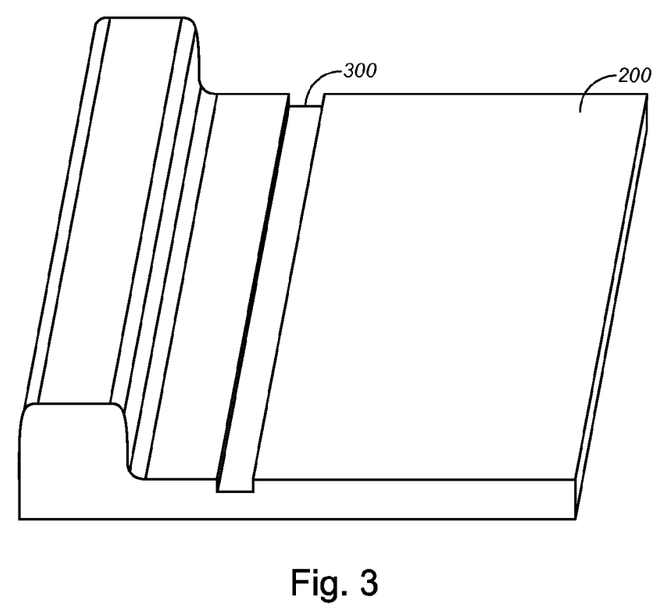
Figure 4:
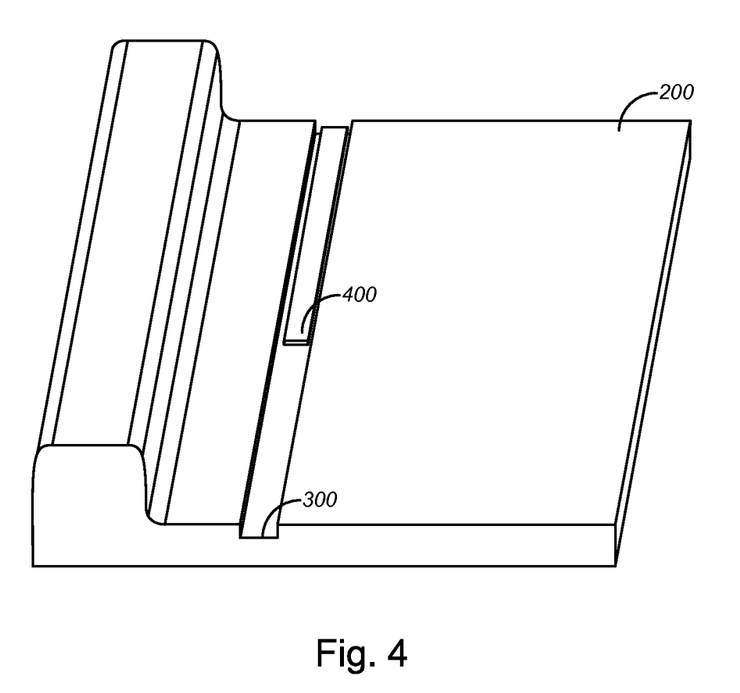
Figure 5:
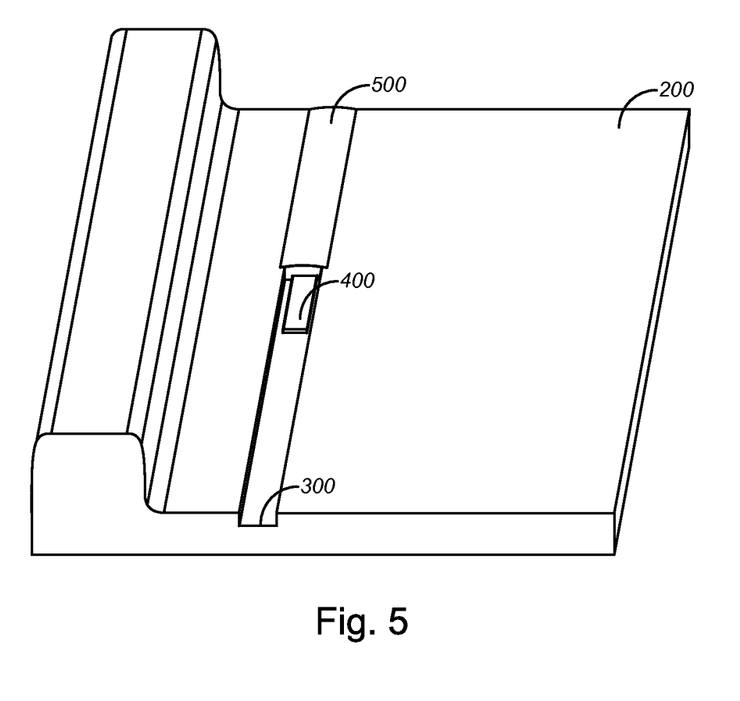

FIGS. 2-5 illustrate another embodiment. FIG. 2 illustrates a portion of a ground surface 200 (including, but not limited to, a roadway surface, or the like) before any channel has been created. FIG. 3 illustrates the surface 200 after a channel or microtrench 300 has been milled or otherwise formed in the surface 200. FIG. 4 illustrates the surface 200 with a conduit 400 placed in the channel 300. FIG. 5 illustrates the surface 200 with conduit 400 placed in the channel 300 and capping material 500 cast in place in a portion of the channel. In some embodiments, the capping material 500 might comprise, but is not limited to, a thermosetting material. In some cases, the capping material 500 might comprise polyurea. In some instances, the capping material 500 might further comprise asphalt emulsion, asphalt cement, fiber modified asphalt, polymer modified emulsion, asphalt rubber, specialty asphalt rubber, low modulus specialty asphalt rubber, silicone, polyester, cement mortar, and/or any combination of these materials.

Figure 6A:
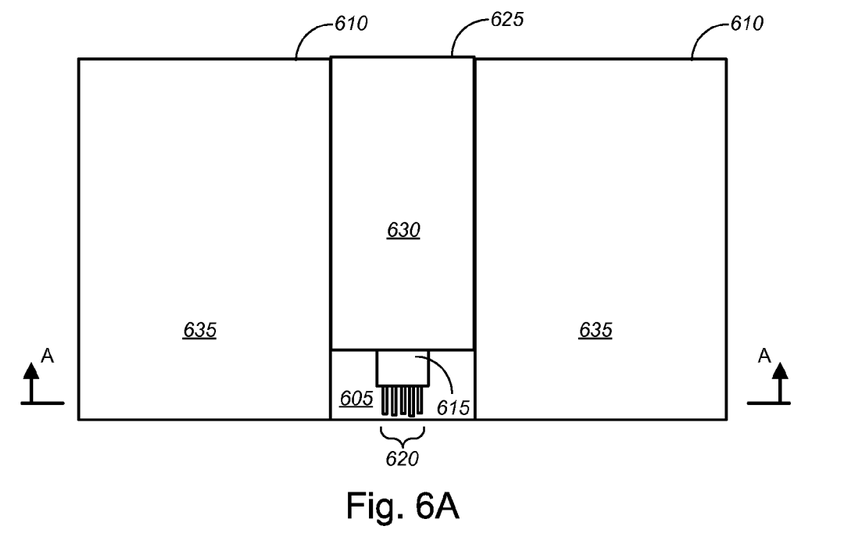
FIGS. 6A-6C illustrate a cast-in-place fiber installation or cast-in-place line installation, in accordance with various embodiments.
Figure 6B:
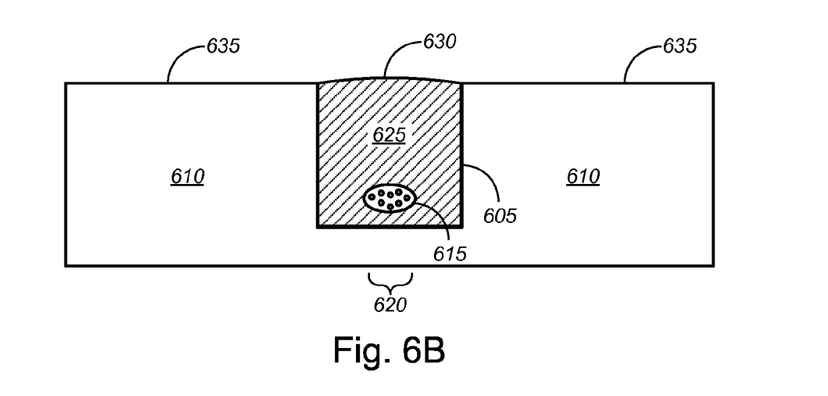
Figure 6C:
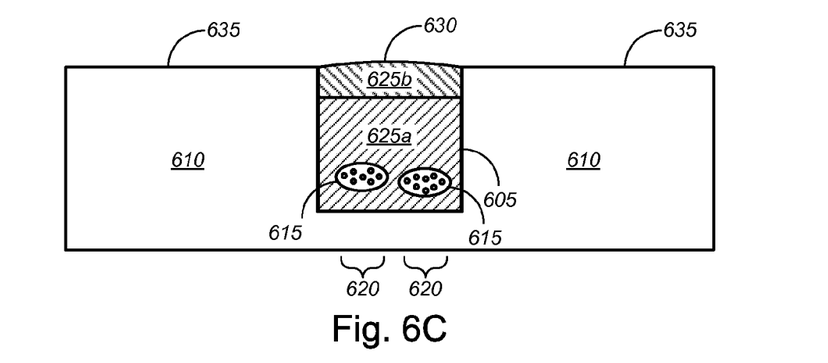

FIGS. 6A-6C (collectively, "FIG. 6") illustrate various views of a cast-in-place fiber installation or cast-in-place line installation, in accordance with a set of embodiments, including a channel 605 milled into a ground surface 610 (including, but not limited to, a roadway, or the like), with one or more conduits 615 placed in the channel. FIG. 6A shows a top view of the cast-in-place fiber installation or cast-in-place line installation, while FIG. 6B shows a side elevation view (or sectional view along the direction indicated by arrows A-A) of FIG. 6A. FIG. 6C shows an alternative embodiment, in which two conduits 615 are placed in the channel 605, and in which two layers of capping material 625a and 625b are used, the first capping material 625a encapsulating the two conduits 615 at the bottom portion of the channel, while the second capping material 625b filling the top portion of the channel.

As illustrated, the one or more conduits 615 each have optical fibers (and/or other lines) 620 disposed within. The channel 605 is then filled with a capping material 625 (which might include, but is not limited to, polyurea, a thermosetting material, or other suitable material, or the like), which has a top surface 630 that is substantially coplanar with the top surface 635 of ground surface 610. In some instances, "substantially coplanar" might refer to the top surface 630 being parallel with top surface 635. In some cases, "substantially coplanar" might refer to the top surface 630 having a slight bulge, bump, or hump as compared with top surface 635.

One feature of some embodiments is that the capping material (e.g., polyurea) can be produced in a number of different colors. Accordingly, certain embodiments can be used not only to install optical fiber and/or other lines, but also to mark roadways (e.g., as lane lines or road surface markings, and/or the like) and other surfaces. From another perspective, optical fiber and/or other lines effectively can be placed under the lane lines or road surface markings on the road in accordance with various embodiments, further increasing the utility of such embodiments.

In some aspects, existing equipment, which is both low cost and portable, for mixing and applying the polyurea can be used to deploy existing polyurea formulations developed in support of the war effort in Iraq and Afghanistan for bulletproofing and blast mitigation applications. Merely by way of example, equipment similar to that used to seal expansion joints in roadways can be used to apply the capping material to the channel. In some embodiments, such equipment might comprise a feeder for extruding or otherwise placing a conduit, while simultaneously extruding or filling the channel around the conduit with the capping material (including, without limitation, polyurea, a thermosetting material, and/or other suitable material, or the like).

In some cases, optical fiber and/or other lines might be fed in the conduit while the conduit is being placed and encapsulated with the capping material. In other cases, the conduit can be placed and encapsulated with the capping material without having any lines pre-fed in this manner; rather, in such cases, the optical fiber and/or other lines might be fed through the conduit at a later time. Such equipment, in some instances, might be a hand-held apparatus, or, in some cases, might be mounted on a vehicle (e.g., construction vehicle, or the like) or other piece of equipment (e.g., construction equipment, or the like). In some embodiments, particularly for applying polyurea, such equipment might comprise a dual/double outlet, spray tip, applicator, etc. for simultaneously spraying, extruding, casting, or pouring di-isocyanate and polyamine in a 1:1 mix ratio; di-isocyanate and polyamine react to form polyurea. According to some embodiments, such equipment might comprise a mixer (such as, but not limited to, a static mixer) that mixes the di-isocyanate and polyamine in a 1:1 mix ratio prior to spraying, extruding, casting, or pouring through a single outlet, spray tip, applicator, etc., e.g., into the channel.

Figure 7A:
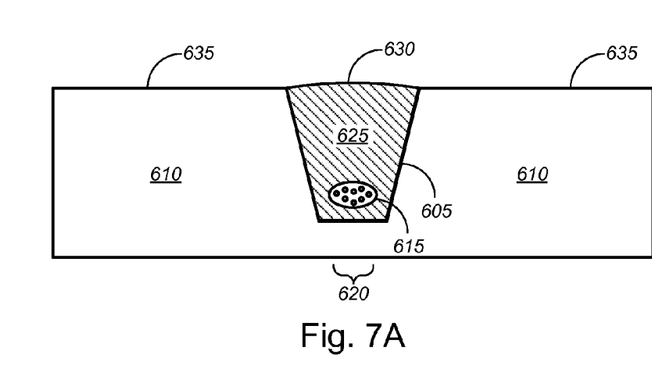
FIGS. 7A-7D illustrate various cast-in-place fiber installation or cast-in-place line installation having various channel shapes, in accordance with various embodiments.
Figure 7B:
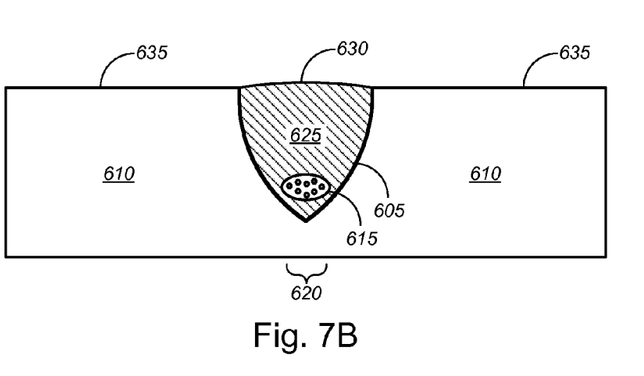
Figure 7C:
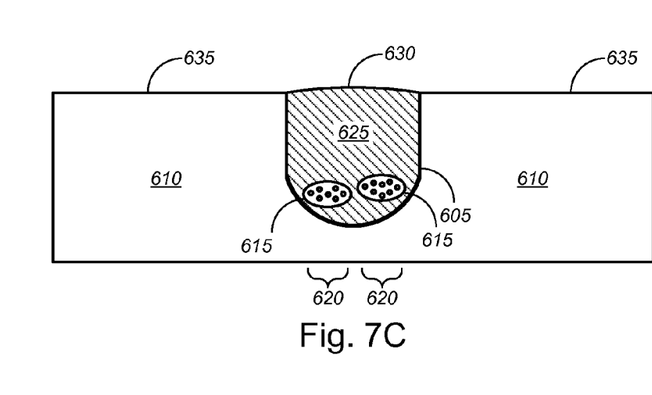
Figure 7D:
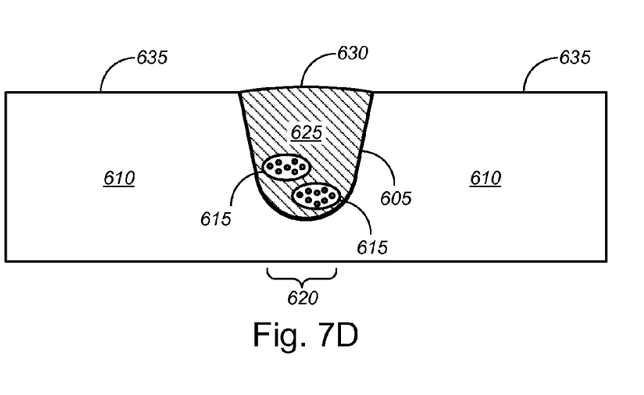

Although FIGS. 3-6 show channels 300 and 605 having square or rectangular profiles/sectional shapes, the various embodiments are not so limited, and the profiles of channels 300 and 605 can be any suitable shape including, without limitation, rectangle, square, triangle, circle, semicircle, oval, trapezoid, parallelogram, guitar-pick-shaped, regular polygon, irregular polygon, or any combination of these shapes, and/or the like. Merely by way of example, FIGS. 7A-7D (collectively, "FIG. 7") illustrate various cast-in-place fiber installation or cast-in-place line installation having various channel shapes (and corresponding shapes of the capping material), in accordance with various embodiments. For example, FIG. 7A shows a trapezoidal channel 605, FIG. 7B shows a spade or guitar-pick-shaped channel 605, FIG. 7C shows a combination rectangle-semicircle channel 605, and FIG. 7D shows a combination trapezoid-semicircle channel 605. The embodiments of FIG. 7 would otherwise be similar, if not identical, to the embodiments of FIGS. 2-6.

While certain features and aspects have been described with respect to exemplary embodiments, one skilled in the art will recognize that numerous modifications are possible. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   creating a channel in a ground surface;
   placing at least one conduit in the channel, the at least one conduit having disposed therewithin one or more lines;
   casting, in place, a capping material, comprising polyurea, around the at least one conduit to substantially fill the channel, such that a top surface of the capping material is substantially coplanar with a top of the ground surface.

2. The method of claim 1, wherein creating a channel comprises milling a channel.

3. The method of claim 1, wherein the capping material comprises a thermosetting material.

4. The method of claim 1, wherein the surface is a roadway surface.

5. The method of claim 1, wherein the capping material mechanically interlocks with pores in a material of the ground surface.

6. The method of claim 4, wherein the capping material serves as road lines on the roadway surface.

7. The method of claim 1, wherein the surface is a paved surface.

8. The method of claim 1, wherein the channel has a width of between about 0.5 inches and about 12 inches.

9. The method of claim 1, wherein the channel has a width of between about 1 inch and about 6 inches.

10. The method of claim 1, wherein the channel has a width of between about 1.5 inches and about 2.5 inches.

11. The method of claim 1, wherein the channel has a width of between about 0.5 inches and about 1 inch.

12. The method of claim 1, wherein the channel has a depth of no greater than about 3 inches.

13. The method of claim 1, wherein the channel has a depth of no greater than about 1 inch.

14. The method of claim 1, wherein the channel has a depth of no greater than about 0.5 inches.

15. The method of claim 1, wherein the one or more lines comprise at least one optical fiber.

16. The method of claim 1, wherein the one or more lines comprise at least one power line.

17. The method of claim 1, wherein the capping material comprises two or more sealant materials.

18. The method of claim 17, wherein the two or more sealant materials comprise a bottom sealant material filling a bottom portion of the channel and a top sealant material filling a top portion of the channel above the bottom sealant material, wherein the bottom sealant material comprises the polyurea and the top sealant material comprises a material selected from a group consisting of asphalt emulsion, asphalt cement, fiber modified asphalt, polymer modified emulsion, asphalt rubber, specialty asphalt rubber, low modulus specialty asphalt rubber, silicone, polyester, and cement mortar.

19. The method of claim 18, wherein the channel has a depth of about 3 inches, wherein the bottom sealant material fills the bottom portion of the channel to a height of about 2.5 inches and the top sealant material fills the top portion of the channel with a height of about 0.5 inches.

20. An apparatus, comprising:
at least one conduit disposed in a channel in a ground surface;
one or more lines disposed in the at least one conduit; and
a capping material, comprising polyurea, cast in place, around the at least one conduit in the channel in the ground surface, wherein a top surface of the capping material is substantially coplanar with a top of the ground surface.

21. The apparatus of claim 20, wherein the capping material comprises two or more sealant materials, wherein the two or more sealant materials comprise a bottom sealant material filling a bottom portion of the channel and a top sealant material filling a top portion of the channel above the bottom sealant material, wherein the bottom sealant material comprises the polyurea and the top sealant material comprises a material selected from a group consisting of asphalt emulsion, asphalt cement, fiber modified asphalt, polymer modified emulsion, asphalt rubber, specialty asphalt rubber, low modulus specialty asphalt rubber, silicone, polyester and cement mortar.

* * * * *